United States Patent [19]

Drake

[11] Patent Number: 4,482,433

[45] Date of Patent: Nov. 13, 1984

[54] PURIFICATION

[75] Inventor: Charles A. Drake, Bartlesville, Okla.

[73] Assignee: Phillips Petroleum Company, Bartlesville, Okla.

[21] Appl. No.: 403,436

[22] Filed: Jul. 30, 1982

[51] Int. Cl.$^3$ .......................... B01D 1/22; B01D 3/34

[52] U.S. Cl. .......................................... 203/59; 203/69; 203/72; 568/438

[58] Field of Search ...................... 203/59, 69, 72, 89; 568/438

[56] References Cited

U.S. PATENT DOCUMENTS

| | | | |
|---|---|---|---|
| Re. 22,379 | 9/1943 | Dunn et al. | 203/59 |
| 2,709,710 | 5/1955 | Crummett et al. | 568/438 |
| 3,000,859 | 9/1961 | Mirviss et al. | 203/69 |
| 3,020,211 | 2/1962 | Smith | 203/72 |
| 3,165,451 | 1/1965 | Louthan | 202/50 |
| 3,497,566 | 2/1970 | Brandt et al. | 203/59 |
| 3,647,640 | 3/1972 | Matsuzawa et al. | 203/59 |
| 4,136,122 | 1/1979 | Cotter | 568/438 |
| 4,379,026 | 4/1983 | Jongsma | 568/438 |

FOREIGN PATENT DOCUMENTS

| | | | |
|---|---|---|---|
| 2558164 | 7/1976 | Fed. Rep. of Germany | 568/438 |
| 6158724 | 12/1981 | Japan | 568/438 |
| 57927 | 8/1969 | Poland . | |

OTHER PUBLICATIONS

Org. Syn. Coll., vol. 1, pp. 214–217, (1941).
Org. Syn., 33, pp. 27–29, (1953).
Chem. Abstracts, 64:1993, (1966).

*Primary Examiner*—Bradley Garris
*Attorney, Agent, or Firm*—A. W. Umphlett

[57] ABSTRACT

The purification of N-substituted aminobenzaldehydes, such as p-dimethylaminobenzaldehyde, is facilitated via the use of stripping agents.

6 Claims, No Drawings

PURIFICATION

BACKGROUND

The production of high purity N-substituted aminobenzaldehydes is difficult because of the low yield of the product-forming reaction and the problems encountered in separating the benzaldehyde product from by-products present in the reaction mixture.

INVENTION

It has been discovered that certain substituted aminobenzaldehydes can be effectively purified, i.e., separated from materials, such as reaction mixtures, containing them, via evaporation in the presence of chemically similar stripping agents.

In one embodiment, crude p-dimethylaminobenzaldehyde is purified by passing it through a wiped film evaporator in the presence of a small amount of N,N-dimethylaniline. For example, when 15 g. of heavies were redistilled with 15 g. of added N,N-dimethylaniline, 11.7 g. of pure p-dimethylaminobenzaldehyde was recovered, while a control to which no N,N-dimethylaniline had been added gave about 9.5 g. of pure dimethylaminobenzaldehyde.

OBJECTS OF THE INVENTION

It is an object of the invention to provide a process for the purification of N-substituted aminobenzaldehydes.

It is another object of the invention to provide a purification process in which the recovery of N-substituted aminobenzaldehydes is aided by separation in the presence of suitable stripping agents.

ADVANTAGES

The process of the invention has several advantages over known processes of recovering the subject benzaldehydes. Using conventional evaporation separators, such as wiped film evaporators, the total recovery of dimethylaminobenzaldehyde or other N-substituted benzaldehydes is significantly improved.

Further, when using a wiped film evaporator as a separator, the unpurified benzaldehyde can be pretreated in the absence of stripping agent to produce higher yields of product.

Other aspects and advantages of the invention will become apparent from a reading of applicant's specification and claims.

DESCRIPTION OF THE INVENTION

Aminobenzaldehydes

The aminobenzaldehydes which are recovered in accordance with the invention are N-substituted benzaldehydes conforming to the general formula:

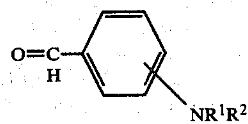

where at least one of $R^1$ and $R^2$ is not hydrogen, and $R^1$ and $R^2$ are selected independently from hydrogen and organic moieties containing from about 1 to 10, and preferably from about 1 to about 6 carbon atoms. Typically, $R^1$ and $R^2$ are both alkyl groups. It is preferred that $R^1$ and $R^2$ be the same and that they be methyl, ethyl, or propyl groups. p-Dimethylaminobenzaldehyde is a highly preferred aminobenzaldehyde.

The N-substituted aminobenzaldehydes to be purified in accordance with the invention can be produced via a variety of known reactions. One typical reaction is the production of p-dimethylaminobenzaldehyde by the formylation of N,N-dimethylaniline with hexamethylenetetramine in the presence of an organic acid, preferably acetic acid.

Other suitable reactions are described in *Organic Synthesis, Coll.* Vol. 1, 214–217 (1941) and *Organic Synthesis,* 33, 27–29 (1953).

Stripping Agents

The stripping agents used in the invention assist in separation of the desired N-substituted benzaldehydes from the other compounds present in the final reaction mixture. The stripping agent is employed in a quantity which facilitates the recovery of purified benzaldehydes from such mixtures. While suitable quantities can be readily determined via routine experimentation, the quantities of stripping agent generally used will lie between about 5:1 and about 1:5, preferably about 1:1 weight ratio, based on the weight of crude dimethylaminobenzaldehyde.

Suitable stripping agents are organic compounds having chemical structures analogous to the compounds to be recovered. Thus, N-substituted anilines are preferred for use in recovering N-substituted aminobenzaldehydes. When p-dimethylaminobenzaldehyde is to be recovered, the stripping agent will preferably comprise N,N-dimethylaniline. When meta-propylaminobenzaldehyde is desired, N-propylaniline will be the preferred stripping agent. Mixtures of stripping agents can be employed.

APPARATUS

The apparatus employed in the recovery process of the invention is an evaporator or other similar devices, the operation of which permits the separation and recovery of the desired benzaldehyde products from crude benzaldehydes or mixtures containing benzaldehydes. Preferred evaporators are known in the art as wiped film evaporators. One suitable apparatus is described in Kirk-Othmer *Encyclopedia of Chemical Technology,* vol. 9, 3rd edition at page 481.

Temperature, pressure, and other parameters to be employed in the purification process will depend upon the nature of the apparatus, the nature of the material to be recovered, and related factors. While parameters such as temperature and pressure can be readily ascertained by routine experimentation, applicant has found that suitable temperatures lie in the range of about 150° to about 275° C. and suitable pressures about 0.1 mm Hg to about 100 mm Hg.

Other conventional separating techniques, such as extractive distillation, can be used in combination with the instant process scheme.

Typical Process Scheme

In a typical purification process carried out in accordance with the invention, the total recovery of dimethylaminobenzaldehyde (DMAB) obtained via wiped film evaporator is enhanced by the addition of dimethylaniline to the crude DMAB before it is fed into the evaporator. The general technique employed was to use two passes through the wiped film evaporator. The first pass was optimized to remove light components, such as unreacted N,N-dimethylaniline and solvent toluene, from the remaining components. The second pass was used to remove product DMAB from unreacted hexamethylenetetraamine and high-boiling reaction byproducts. The addition of N,N-dimethylaniline was made to the material obtained from the first pass, before sending it through the wiped film evaporator for the second pass. A third pass could then be employed to separate the N,N-dimethylaniline from the purified p-dimethylaminobenzaldehyde.

EXAMPLES

Example I

First Pass Through the WFE

Crude p-dimethylaminobenzaldehyde (DMAB, about 70% purity) which contained unreacted N,N-dimethylaniline (DMA) and hexamethylenetetramine (MTA), solvent toluene and higher reaction products was passed through a wiped film evaporator under a variety of conditions (temperature and pressure) in efforts to optimize the separation of light boiling components N,N-dimethylaniline, toluene and the like from product DMAB and higher boiling components. Results are summarized in Table I.

TABLE I

| | | | First Pass Through WFE | | | | |
|---|---|---|---|---|---|---|---|
| | | | Light Fraction | | | Heavy Fraction | |
| Run # | Press., mm Hg | Temp., °C. | Tol, wt % | DMA, wt % | DMAB, wt % | DMA, wt % | DMAB, wt % |
| 1 | 15 | 120 | 25 | 15 | 60 | — | 100 |
| 2 | 15 | 100 | 25 | 35 | 40 | 10 | 90 |
| 3 | 25 | 100 | 15 | 70 | 15 | 15 | 85 |
| 4 | 35 | 100 | 10 | 85 | 5 | 15 | 85 |
| 5 | 100 | 120 | 20 | 70 | 10 | — | 100 |
| 6 | 200 | 130 | 25 | 70 | 5 | — | 100 |
| 7 | 400 | 130 | 25 | 74 | 1 | 5 | 95 |

These results indicate that under appropriate conditions, essentially all the light boiling components (such as toluene and DMA) can be removed from the DMAB (and higher boiling material) in the first pass through the wiped film evaporator.

Example II

Second Pass Through WFE

The "heavy" fraction (non-volatiles) from the first pass of crude DMAB through the wiped film evaporator was subjected to a second pass through the WFE under different conditions in order to separate the product DMAB from other high-boiling components. The first pass was carried out under conditions described in Table I, Run #6. The second pass was then carried out in the presence or absence of added N,N-dimethylaniline.

TABLE II

| | | | Second Pass Through WFE | | | | | |
|---|---|---|---|---|---|---|---|---|
| | | | Light Fraction | | | Heavy Fraction | | |
| Run # | Press., mm Hg | Temp., °C. | % Recov. | DMA, wt % | DMAB, wt % | % Recov. | DMAB, wt % | Heavies, wt % |
| 1* | 10 | 200 | 60 | — | 95 | 33 | 50 | 50 |
| 2** | 10 | 200 | 83 | 55 | 40 | 13 | 10 | 90 |
| 3** | 10 | 220 | 87 | 50 | 45 | 10 | — | 100 |
| 4~ | 200 | 130 | 54 | 95 | 3 | 42 | 100 | — |

*15 g of first pass DMAB
**15 g of first pass DMAB + 15 g DMA
~Light fraction from Run #3

Comparison of Run #1 to Run #2 indicates that addition of N,N-dimethylaniline aids separation of DMAB from other high boiling components on the second pass through the WFE. The increase in temperature (compare Runs #2 and #3) from 200° to 220° C. enables essentially complete separation of product DMAB from other high boiling components. Run #4 was carried out with the light boiling fraction (DMA+DMAB) from Run #3 to demonstrate that essentially complete removal of DMA from the purified DMAB fraction can be accomplished under the same conditions found optimum for the first pass of crude DMAB through the WFE (see Run #5, Table I).

Reasonable variations, such as those which would occur to the skilled artisan, can be made herein without departing from the scope of the invention.

I claim:

1. A process for separating N-organically substituted aminobenzaldehydes from a material containing N-organically substituted aminobenzaldehydes and higher boiling products of the reaction of preparing N-organically substituted aminobenzaldehydes, said process comprising the steps of adding N-organically substituted aniline stripping agent to said material, evaporating the material in the presence of sufficient added N-organically substituted aniline stripping agent to assist in the separation wherein the organic substitutents of the aniline compound are identical or next adjacent homologous to the organic substitutents of the aminobenzaldehyde product and the weight ratio of said aniline stripping agent to the crude N-organically substituted aminobenzaldehyde in the material is about 5:1 to about 1:5.

2. The process of claim 1 wherein the evaporation is performed at a temperature in the range of about 150° to about 275° C., and at a pressure in the range of about 0.1 mm Hg to about 100 mm Hg.

3. The process of claim 1 wherein the N-organically substituted aminobenzaldehydes conform to the general formula:

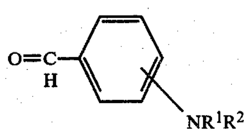

where at least one of $R^1$ and $R^2$ is not hydrogen and $R^1$ and $R^2$ are selected independently from hydrogen and organic moieties containing from about 1 to 10 carbon atoms.

4. A process of claim 1 wherein the material is pretreated by passing it through a wiped film evaporator prior to evaporation in the presence of added agent.

5. The process of claim 4 wherein the N-organically substituted aminobenzaldehyde to be recovered is p-dimethylaminobenzaldehyde.

6. The process of claim 5 wherein the added agent is N,N-dimethylaniline.

* * * * *